No. 694,042. Patented Feb. 25, 1902.
R. C. VROOM.
BREAD TOASTER.
(Application filed Sept. 21, 1901.)
(No Model.)
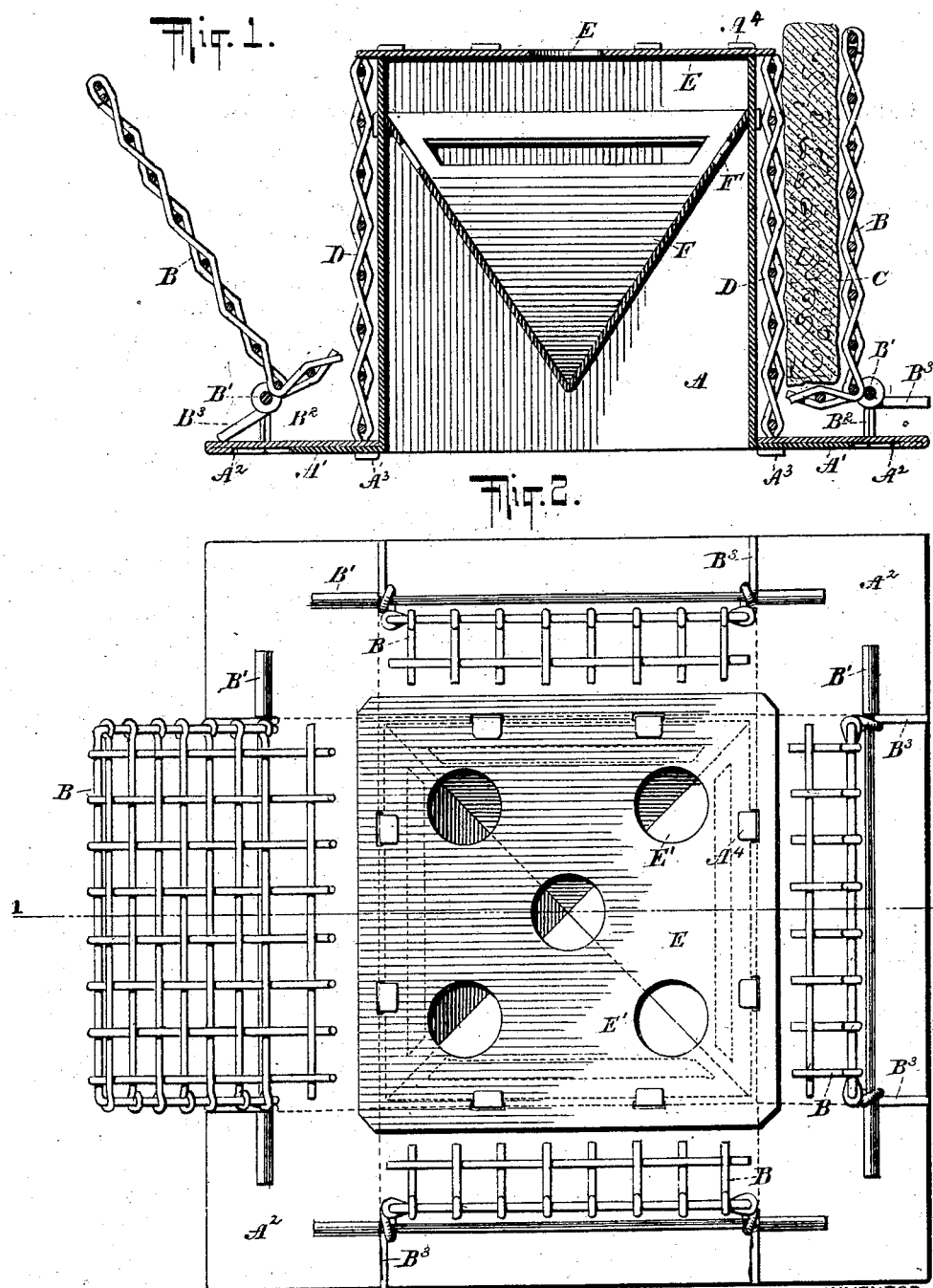
WITNESSES:
Gustave Dieterich
John Lotka
INVENTOR
Robert C. Vroom
BY Briesen & Knauth
ATTORNEYS

UNITED STATES PATENT OFFICE.

ROBERT C. VROOM, OF SAN DIEGO, CALIFORNIA.

BREAD-TOASTER.

SPECIFICATION forming part of Letters Patent No. 694,042, dated February 25, 1902.

Application filed September 21, 1901. Serial No. 76,020. (No model.)

*To all whom it may concern:*

Be it known that I, ROBERT C. VROOM, a citizen of the United States, and a resident of San Diego, county of San Diego, State of California, have invented a certain new and useful Improvement in Bread-Toasters, of which the following is a specification.

My invention relates to culinary utensils, and has for its object to provide a bread-toaster which will be simple in construction, efficient in operation, and easy to manipulate.

The invention consists in certain features of construction and arrangement that will be fully described hereinafter and particularly pointed out in the appended claims.

Reference is to be had to the accompanying drawings, in which—

Figure 1 is a sectional elevation of my improved toaster on line 1 1 of Fig. 2, and Fig. 2 is a plan thereof.

The invention is adapted for use particularly in connection with gas, gasolene, and oil stoves, and it will be understood that the body A, which is hollow, is set above the burner of the stove. Lateral extensions or flanges A' form a partial support for the body A. Over said body is slipped the base $A^2$, which rests on the flanges A' and is held in position by lugs $A^3$, passing through slots in the flanges A'. The base $A^2$ forms a further support for the body A and, together with the flanges A', provides means for carrying the bread-supports B. These are pivoted about horizontal axes B' on standards $B^2$, rising from the base $A^2$, and consist of wirework or other apertured material, having two members substantially at right angles to each other, so that in cross-section the bread-support will be practically L-shaped, as shown in Fig. 1. Each of the supports B is provided with extensions $B^3$ at its pivot, the said extensions serving to limit the outward swinging movement of the supports, as indicated at the left in Fig. 1. There are as many supports B as the centrally-located body A has sides. Thus with a square body, such as shown, there will be four bread-supports, each swinging about an axis parallel to the adjacent side of the central body A.

In order that the bread C may not engage the body A directly when in the inner position, (shown at the right in Fig. 1,) I provide on each side of the body A an apertured grating or wire-netting D, secured in any suitable manner.

At the upper end of the body A is suitably supported a top or cover E, as by means of lugs $A^4$, projecting from the upper edge of the body through slots at the top. This top is also apertured, as shown at E', to allow the hot combustion products to pass out. Within the body is arranged a spreader F, pointed at its lower end and flaring upwardly, so that the flame will be directed toward the walls of the body A, that are adjacent to the gratings D. The gases then pass through apertures F' in the spreader and finally escape through the openings E', as previously stated.

In using this utensil the bread-supports B are first swung outward into the position shown in Fig. 1, and the bread is then placed in position, resting on the short lower member of the bread-support. Then this support is swung inward, using the extensions $B^3$ as handles, until the bread to be toasted comes in contact with the grating D, as shown at the right in Fig. 1. As this grating is adjacent to the body A, heated by the flame, the grating itself will become heated and the bread will become toasted, it being understood that a sufficient amount of air has access to the inner side of the bread to prevent a too strong action of the heat. When the bread has been toasted on one side, the support B is again swung into the position shown at the left in Fig. 1, and then the bread may be turned over, as usual, and the support again swung upward to toast the other side of the bread. The base $A^2$, resting on the flanges A', gives a double thickness of metal under the bread-supports B, and thus prevents any burning of the lower crust or edge of the bread while on said support.

I claim as my invention—

1. A bread-toaster comprising a body having an imperforate wall adapted to be heated, a stationary grating located exteriorly of said imperforate wall and a movable bread-support adapted to carry bread toward and from the said grating.

2. A bread-toaster comprising a central heating-body of polygonal shape, stationary gratings located adjacent to the sides of the said body and bread-supports pivoted about axes parallel and adjacent to the respective sides of the heating-body.

3. A bread-toaster comprising a heating-body provided with an imperforate wall, a stationary grating on the outside of said wall and an apertured bread-support movable toward and from said grating.

4. A bread-toaster comprising a heating-body provided with an imperforate wall, a grating adjacent to said wall and an apertured bread-support pivoted about an axis parallel to the plane of the grating.

5. A bread-toaster comprising a hollow heating-body apertured at the top, an apertured spreader located within said body and movable bread-supports located exteriorly of the body and adapted to carry the bread to be toasted toward and from the body.

6. A bread-toaster comprising a heating-body provided with a surrounding flange at the bottom, a base resting on the flange of the body, and a movable bread-support located above said flange and arranged to carry the bread toward and from the heating-body.

ROBERT C. VROOM.

Witnesses:
FREDERIC W. STEARNS,
A. H. SWEET.